United States Patent
Manandise et al.

(10) Patent No.: US 12,118,309 B2
(45) Date of Patent: Oct. 15, 2024

(54) CONVERTING FROM COMPRESSED LANGUAGE TO NATURAL LANGUAGE

(71) Applicant: Intuit Inc., Mountain View, CA (US)

(72) Inventors: Esmé Manandise, Tallahassee, FL (US); Glenn Carter Scott, Los Altos Hills, CA (US)

(73) Assignee: Intuit Inc., Mountain View, CA (US)

( * ) Notice: Subject to any disclaimer, the term of this patent is extended or adjusted under 35 U.S.C. 154(b) by 389 days.

(21) Appl. No.: 17/488,270

(22) Filed: Sep. 28, 2021

(65) Prior Publication Data

US 2023/0101746 A1    Mar. 30, 2023

(51) Int. Cl.
*G06F 40/284*    (2020.01)

(52) U.S. Cl.
CPC .................................. *G06F 40/284* (2020.01)

(58) Field of Classification Search
None
See application file for complete search history.

(56) References Cited

U.S. PATENT DOCUMENTS

| | | | | |
|---|---|---|---|---|
| 6,470,306 | B1 * | 10/2002 | Pringle | G06F 40/169 |
| | | | | 715/236 |
| 8,082,144 | B1 * | 12/2011 | Brown | G06Q 20/207 |
| | | | | 715/224 |
| 9,858,270 | B2 * | 1/2018 | Bird | G06F 16/93 |
| 10,509,862 | B2 * | 12/2019 | Wang | G06F 40/129 |
| 11,436,122 | B1 * | 9/2022 | Matham | G06F 11/3409 |
| 2007/0203991 | A1 * | 8/2007 | Fisher | G06Q 10/107 |
| | | | | 709/206 |
| 2014/0281935 | A1 * | 9/2014 | Byron | G06F 40/177 |
| | | | | 715/249 |
| 2015/0205866 | A1 * | 7/2015 | Shaw | G06F 16/951 |
| | | | | 707/E17.084 |
| 2015/0363382 | A1 * | 12/2015 | Bohra | G06F 40/30 |
| | | | | 704/9 |
| 2017/0017641 | A1 * | 1/2017 | Gidney | G06F 40/289 |
| 2018/0107702 | A1 * | 4/2018 | Havlicek | G06F 40/247 |
| 2020/0104360 | A1 * | 4/2020 | Gahlot | G06N 3/08 |
| 2021/0286831 | A1 * | 9/2021 | Girardi | G06N 20/20 |
| 2021/0350075 | A1 * | 11/2021 | Goel | G06F 17/18 |
| 2023/0039689 | A1 * | 2/2023 | Guy | G06F 40/284 |

FOREIGN PATENT DOCUMENTS

| | | | | |
|---|---|---|---|---|
| EP | 1672531 | A2 * | 6/2006 | G06F 17/27 |
| EP | 3438844 | A1 * | 2/2019 | G06F 16/90332 |
| WO | WO-2020012483 | A1 * | 1/2020 | |

OTHER PUBLICATIONS

Translation of Japanese Patent—JP4638599B2 (Year: 2011).*

* cited by examiner

*Primary Examiner* — Paras D Shah
(74) *Attorney, Agent, or Firm* — Lathrop GPM LLP

(57) ABSTRACT

A method converts from compressed language to natural language. The method includes receiving an element string. The element string is in a compressed language format and is extracted from a document in a structured document language. The method includes tokenizing the element string to form multiple element tokens, generating a token set from the element tokens, and generating a name string from multiple token sets. The name string is in a natural language format.

20 Claims, 6 Drawing Sheets

FIGURE 4

SCHEDULE C (Form 1040)
Department of the Treasury
Internal Revenue Service (99)

Profit or Loss From Business
(Sole Proprietorship)
▶ Go to www.irs.gov/ScheduleC for instructions and the latest information.
▶ Attach to Form 1040, 1040-SR, 1040-NR, or 1041; partnerships generally must file Form 1065.

OMB No. 1545-0074
2020
Attachment Sequence No. 09

Name of proprietor | Social security number (SSN)

Part II Expenses. Enter expenses for business use of your home only on line 30.

| | | | | | | |
|---|---|---|---|---|---|---|
| 8 | Advertising | 8 | | 18 | Office expense (see instructions) | 18 |
| 9 | Car and truck expenses (see instructions) | 9 | | 19 | Pension and profit-sharing plans | 19 |
| 10 | Commissions and fees | 10 | | 20 | Rent or lease (see instructions): | |
| 11 | Contract labor (see instructions) | 11 | | a | Vehicles, machinery, and equipment | 20a |
| 12 | Depletion | 12 | | b | Other business property | |
| 13 | Depreciation and section 179 expense deduction (not included in Part III) (see instructions) | 13 | | 21 | Repairs and maintenance | 21 |
| | | | | 22 | Supplies (not included in Part III) | 22 |
| | | | | 23 | Taxes and licenses | 23 |
| 14 | Employee benefit programs (other than on line 19) | 14 | | 24 | Travel and meals: | |
| 15 | Insurance (other than health) | 15 | | a | Travel | 24a |
| 16 | Interest (see instructions): | | | b | Deductible meals (see instructions) | 24b |
| a | Mortgage (paid to banks, etc.) | 16a | | 25 | Utilities | 25 |
| b | Other | 16b | | 26 | Wages (less employment credits) | 26 |
| 17 | Legal and professional services | 17 | | 27a | Other expenses (from line 48) | 27a |
| | | | | b | Reserved for future use | 27b |

[Callout 402: "Rent or lease of vehicles, machinery, and equipment 402" pointing to line 20a, with labels 405 and 408]

400

CONVERTING FROM COMPRESSED LANGUAGE TO NATURAL LANGUAGE

BACKGROUND

Computing systems display forms with fields into which users input data. The fields are represented by elements written in compressed language that may not be understandable to users of the system and may not help users understand the meaning of the field. A challenge is to automatically generate strings in natural language from compressed language that are understandable to users to convey the meanings of the fields.

SUMMARY

In general, in one or more aspects, the disclosure relates to a method that converts from compressed language to natural language. The method includes receiving an element string. The element string is in a compressed language format and is extracted from a document in a structured document language. The method includes tokenizing the element string to form multiple element tokens, generating a token set from the element tokens, and generating a name string from multiple token sets. The name string is in a natural language format.

In general, in one or more aspects, the disclosure relates to a system that includes a set controller configured to generate a token set, a name controller configured to generate a name string, an element language model configured to identify compressed language word sequences, a corpus language model configured to identify natural language word sequences, and a server application that executes on one or more servers. The server application is configured for receiving an element string. The element string in a compressed language format and is extracted from a document in a structured document language. The server application is configured for tokenizing the element string to form multiple element tokens. The server application is configured for generating, with the set controller, the token set from the element tokens using the element language model and the corpus language model. The server application is configured for generating, with the name controller, the name string from multiple token sets. The name string is in a natural language format.

In general, in one or more aspects, the disclosure relates to a method that includes receiving a structured document that includes an element string. The element string is in a compressed language format. The element string is tokenized to form multiple element tokens. The element tokens are used to generate a token set. The token set is one of multiple token sets used to generate a name string, from the element string, in a natural language format. The method includes displaying the structured document with the name string in the natural language format in response to a user input.

Other aspects of the invention will be apparent from the following description and the appended claims.

BRIEF DESCRIPTION OF DRAWINGS

FIG. 3 and FIG. 4 show examples in accordance with disclosed embodiments.

DETAILED DESCRIPTION

Figure 1:
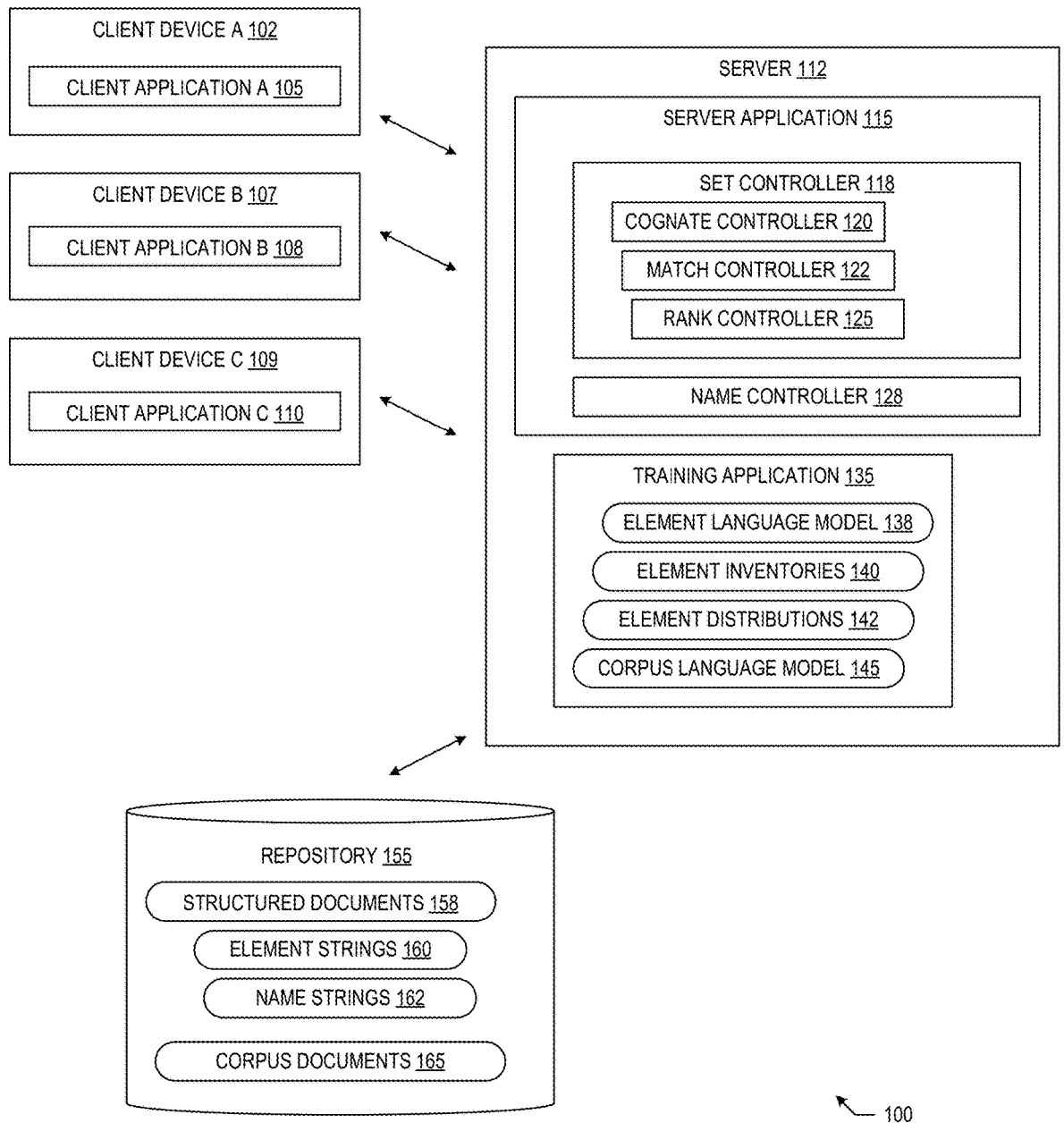
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure generate natural language from compressed language to help users understand the meaning of fields in forms. For example, a user may fill out a financial (e.g., tax) form with a computer through an online website. The financial form is written in a structured document language (e.g., extensible markup language (XML)) and includes several fields of information for the user to fill in. Each field of the financial form is represented by an element that uses compressed language to describe the field and type of data to be entered, which and may not be understandable to the user. The system takes the compressed language, generates natural language from the compressed language, and presents the natural language to the user with the field so that the user may read the natural language and understand the meaning of the field.

For example, a field of a tax form may be represented by the compressed language string "IRS4835/Rent_leaseMach_equip", which may not be understandable to the user. The system converts from the compressed language string to the natural language string "Rent or lease of vehicles, machinery, and equipment", which is displayed with the field on the computer for the user to understand the meaning of the field.

FIG. 1 shows a diagram of embodiments that are in accordance with the disclosure. FIG. 1 shows a diagram of the system (100) that converts from compressed language to natural language. Embodiments of FIG. 1 may be combined and may include or be included within the features and embodiments described in the other figures of the application. The features and elements of FIG. 1 are, individually and as a combination, improvements to machine learning technology and computing systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) generates the natural language name strings (162) form the compressed language element strings (160) and displays the name strings with the structured documents (158) to the users of the client devices A (102) through C (109). The system (100) includes the client devices A (102), B (107), C (109), the server (112), and the repository (155).

Figure 5A:
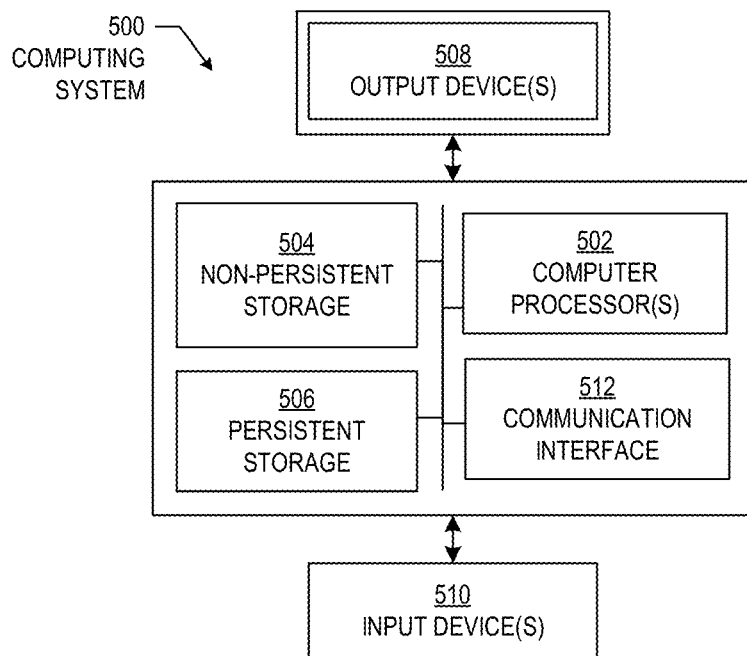
FIG. 5A and FIG. 5B show computing systems in accordance with disclosed embodiments.

The client devices A (102), B (107), and C (109) are computing systems (further described in FIG. 5A). For example, the client devices A (102), B (107), and C (109) may be desktop computers, mobile devices, laptop computers, tablet computers, etc. The client devices A (102) through C (109) include hardware components and software components that operate as part of the system (100). The client devices A (102) through C (109) communicate with the server (112) to display and manipulate forms and control the machine learning models used by the system (100). The client devices A (102) through C (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The client devices A (102), B (107), and C (109) respectively include the client applications A (105), B (108), and C (110).

The client application A (105), the client application B (108), and the client application C (110) may each include multiple programs respectively running on the client devices A (102), B (107), and C (109). The client applications A (105) through C (110) may be native applications, web applications, embedded applications, etc. In one embodiment the client applications A (105) through C (110) include web browser programs that display web pages from the server (112).

In one embodiment, the client device A (102) may be used by a taxpayer to provide tax information for a tax form hosted by the server (112). The user of the client device A (102) may load a website hosted by the server (112). The website displays one of the structured documents (158) (e.g., a tax form) to which the user inputs information that is received by the server (112).

In one embodiment, the client device B (107) may be used by a tax preparer to prepare tax forms hosted by the server (112). The user of the client device B (107) may prepare and review a tax form populated with tax information from a taxpayer using the system (100).

The client device C (109) may be used by a developer to control the hardware and software components of the system (100). The developer using the client device C (109) may control the timing and training of machine learning models through training application (135). The machine learning models include the element language model (138) and the corpus language model (145).

The server (112) is a computing system (further described in FIG. 5A). The server (112) may include multiple physical and virtual computing systems that form part of a cloud computing environment. In one embodiment, execution of the programs and applications of the server (112) is distributed to multiple physical and virtual computing systems in the cloud computing environment. In one embodiment, the server (112) includes the server application (115) and the training application (135).

The server application (115) is a collection of programs that may execute on multiple servers of a cloud environment, including the server (112). In one embodiment, the server application (115) hosts websites and generates natural language strings (e.g., the name strings (162), further described below) for compressed language strings (e.g., the element strings (160), further described below). The websites hosted by the server application (115) may serve the structured documents (158) with the name strings (162) to the users of the client devices A (102) through C (109). The natural language strings generated by the server application (115) include the name strings (162). The server application (115) includes the set controller (118) and the name controller (128).

The set controller (118) is a set of hardware and software components of the server application (115). The set controller (118) identifies sets of tokens from the element strings (160). The sets of tokens (also referred to as token sets) are used to generate the name strings (162). The set controller (118) includes the cognate controller (120), the match controller (122), and the rank controller (125).

The cognate controller (120) is a set of hardware and software components of the set controller (118). The cognate controller (120) identifies cognate tokens from element tokens identified in the element strings. A token is a representation of a word from a portion of a string (also referred to as a substring). In one embodiment, a token is a string. In one embodiment, a token is a unique numerical value that represents the string of characters that the token represents. Cognates (and corresponding tokens) represent words that are similar to an initial word. For example, cognates of the word "equip" include "equips"; "equipped"; "equipping"; "equipment"; "equipments", etc. The cognate controller (120) receives an element token and generates a list of cognate tokens from the element token.

The match controller (122) is a set of hardware and software components of the set controller (118). The match controller (122) identifies a set of matched tokens from an element token that was unrecognized using element language models, element inventories, and element distributions, which are further described below. For example, an element tokens representing the strings "txb" or "txbl" may be unrecognized as words. The match controller (122) may match "txb" or "txbl" to the word "taxable".

The rank controller (215) is a set of hardware and software components of the set controller (118). The rank controller (215) ranks (or re-ranks) the matched tokens from the match controller. For example, the matched tokens for the strings "prison" and "person" may be generated for the token for the string "prsn". The rank controller (215) may re-rank the matched tokens so that the token for "person" is ranked higher than the token for "prison".

The name controller (128) is a set of hardware and software components of the set controller (118). The name controller (128) generates a name string from a set of tokens that were generated from an element string. The name controller uses a corpus language model and corpus grammar rules to select and arrange tokens from the token set into a natural language phrase.

The training application (135) is a collection of programs that may execute on the server (112). The training application (135) trains the machine learning models used by the system (100) using training data, which may include the structured documents (158) and the corpus documents (165). The machine learning models trained by the training application (135) include the element language model (138), the element inventories (140), the element distributions (142), and the corpus language model (145).

The element language model (138) identifies common sequences of words in a compressed language. The element language model (138) is generated from the structured documents (158). The element language model (138)

includes the element inventories (140) and the element distributions (142). In one embodiment, the element language model (138) is an n-gram model.

The element inventories (140) are generated from the structured documents (158). The element inventories (140) identify common characters of words in a compressed language. In one embodiment, the element inventories (140) include vowel and consonant inventories for the words in the structured documents (158).

The element distributions (142) are generated from the structured documents (158). The element distributions (142) identify common sequences of characters of words in a compressed language. In one embodiment, the element inventories (140) include vowel and consonant distributions for the words in the structured documents (158).

The corpus language model (145) identifies common sequences of words in a natural language (also referred to as a corpus language). The corpus language model (145) is generated from the corpus documents (165). In one embodiment, the corpus language model (145) is an n-gram model.

The repository (155) is a computing system that may include multiple computing devices in accordance with the computing system (500) and the nodes (522) and (524) described below in FIGS. 5A and 5B. The repository (155) may be hosted by a cloud services provider that also hosts the server (112). The cloud services provider may provide hosting, virtualization, and data storage services as well as other cloud services and to operate and control the data, programs, and applications that store and retrieve data from the repository (155). The data in the repository (155) includes the structured documents (158), the element strings (160), the name strings (162), the corpus documents (165), etc.

The structured documents (158) are electronic files that store data. The structured documents (158) use a structured document language, which may be a markup language e.g., extensible markup language (XML). In one embodiment, the structured documents (158) include tree-like structures with elements (also referred to as data model elements) that encode the data within the structured documents (158). Each element may have several properties and values that store information and represent the fields of forms. For example, a structured document may represent a tax form with an element representing a field in the tax form. A base language (a natural language such as English, French, Italian, etc.) may be used to construct the structured documents. The base language may be detected from the structured documents (158).

The elements that form the structured documents (158) may use addition encoding practices. The name of an element may code natural language words or phrase using the absence of spaces, camel case notation (capitalizing the start of each word without using spaces, e.g., "CamelCase"), forward slashes to discriminate among phrases within an expression, the use of single uppercase characters to tokenize substrings, a subset of words that look like standard natural language words, clusters of uppercase alphabetic and numeric substrings, a higher incidence of consonants than vowels, etc.

The element strings (160) are strings that identify the elements in the structured documents. In one embodiment, the element strings (160) are XPATH (extensible markup language (XML) path language) strings generated from the structured documents (158). For example, the element string "IRS4835/MtgIntPaidToBanks" may be generated from a structured language document representing the tax form IRS4835 for the field for "Mortgage interest paid to banks".

The element string " " uses abbreviations, forward slashes, camel case notation, upper/lowercase encodings to identify the type of information for an element in a structured document.

The name strings (162) are natural language strings generated from the element strings (160). In one embodiment, the name strings (162) may be stored in and displayed with the structured documents (158).

The corpus documents (165) are natural language documents that are related to the structured documents (158). For example, the structured documents (158) may be XML versions of tax forms and the corpus documents (165) may be natural language versions of the tax forms, tax laws, accounting treatises, etc., that discuss the tax forms stored in the structured documents (158).

Figure 2A:
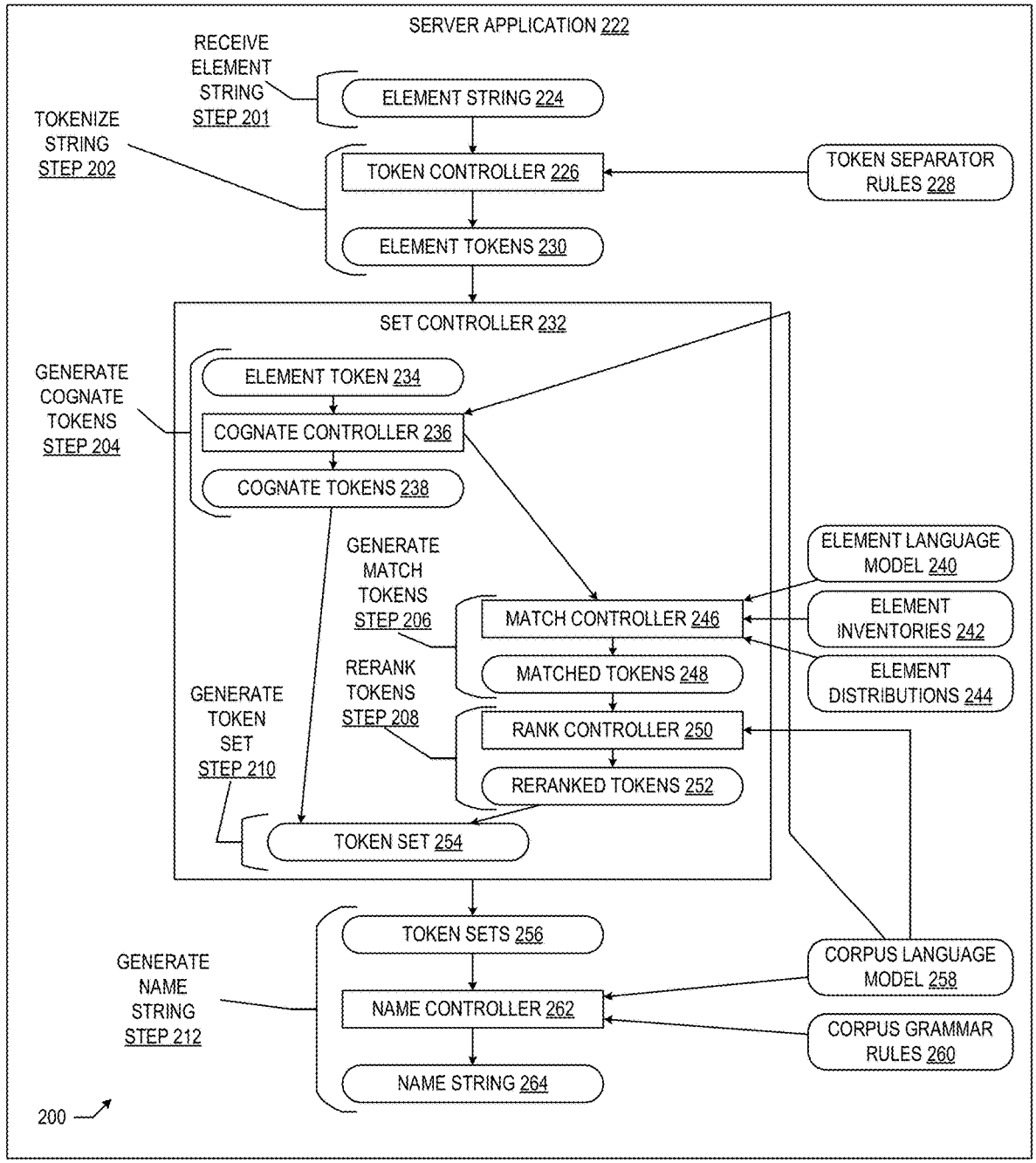
FIG. 2A and FIG. 2B show data and flow diagrams in accordance with disclosed embodiments.
Figure 2B:
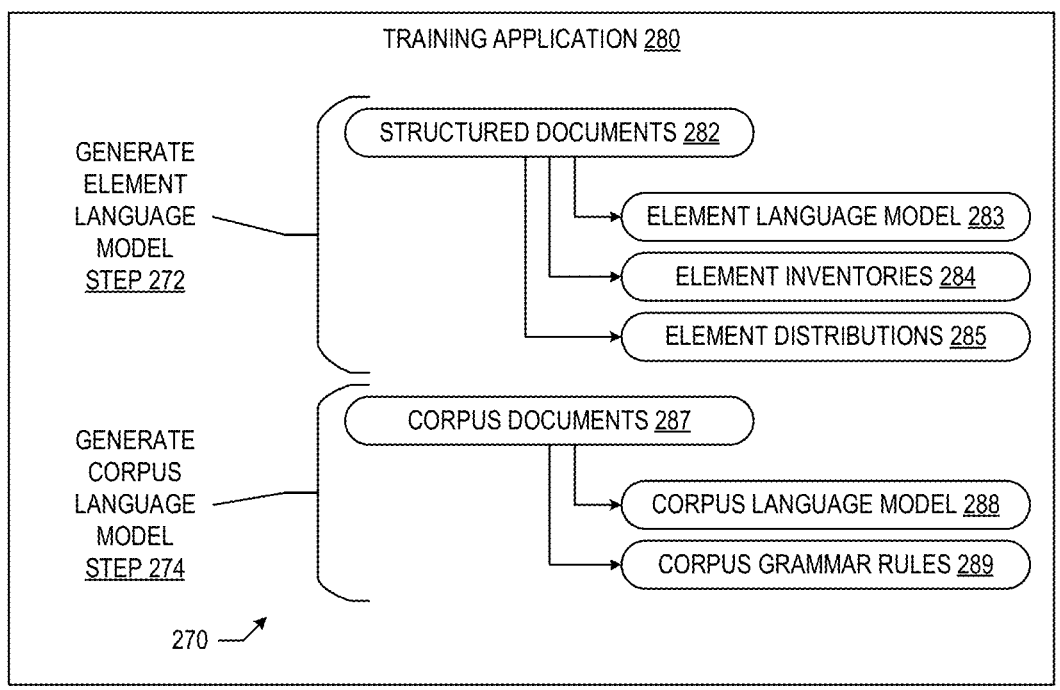

FIGS. 2A and 2B show data and flow diagrams of processes in accordance with the disclosure. FIG. 2A illustrates the process (200) to generate name strings. FIG. 2B illustrates the process (270) to train machine learning models. The embodiments of FIGS. 2A and 2B may be combined and may include or be included within the features and embodiments described in the other figures of the application. The features of FIGS. 2A and 2B are, individually and as an ordered combination, improvements to machine learning technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2A, the process (200), including the steps (202) through (212), generates name strings from element strings. The process (200) may execute as part of the server application (222).

At Step 201, element strings are received. The element string (224) may be received by the server application (222) after being extracted from a structured document. The structured document may be generated using a base language (e.g., English) for the names of the elements in the structured document. Multiple compression methods (e.g., vowel removal) may be used to form a compressed language for the elements of the structured document. The element string (224) is in a compressed language format and is extracted from a document in a structured document language. The element string (224) may be extracted using a path language (e.g., XPATH).

At Step 202, strings are tokenized. For example, the element string (224) may be tokenized by the token controller (226) using the token separator rules (228) to form the element tokens (230). The element string (224) may be tokenized by dividing the element string (224) into element tokens after identifying a divider, which may include a symbol (e.g., the character "/") or a change in case for word separation. The token separator rules (228) may identify the separators used in the element string (224) to demarcate the different words or phrases in the element string (224). The element tokens (230) represent the words and phrases from the element string (224). As an example, the element string "IRS4835/Rent_leaseMach_equip" may be converted to the tokens "IRS4835", "Rent", "lease", "Mach", "equip". The tokens in the element string "IRS4835/Rent_leaseMach_equip" are separated by dividers ("_" and "/") and by case changes (e.g., "leaseMach" represents two tokens). The element tokens (230) are sent to the set controller (232). In one embodiment, the element tokens (230) may be integer values that uniquely identify words from a natural language. In one embodiment, the element tokens (230) may be string representations of the words from a natural language.

At Step 204, cognate tokens are generated. The cognate tokens (238) may be generated using the corpus language model (258) by matching cognate tokens identified by the corpus language model (258) to the element token (234). For example, the cognate tokens (238) may be generated by the cognate controller (236) from the element token (234) using the corpus language model (258). The element token (234) is one of the element tokens (230). The corpus language model (258) identifies the words of the natural language to which the element string (224) is being converted. The cognate tokens (238) represent words that are similar to the word represented by the element token (234). A set of cognate tokens may be generated for each of multiple element tokens of a set of element tokens from the element string (224).

At Step 206, matched tokens (which may also be referred to a possible candidate tokens) are generated. When the element token (234) is not recognized as a word in a natural language, the match controller (246) may identify the matched tokens (248) that match to the element token (234). The matched tokens (248) represent words that match to the word represented by the element token (234). The matched tokens (248) are identified using the element language model (240), the element inventories (242), and the element distributions (244). Additional heuristics may be used to identify the matched tokens (248).

In one embodiment, the element language model (240) is a language model generated from a structured document from which the element string (224) was extracted. The element language model (240) identifies the words found in a set of structured documents to which the element token (234) is matched.

The element inventories (242) include consonant and vowel inventories for the words identified from the structured documents from which the element string (224) was extracted. The element distributions (244) include distributions of characters in the words identified from the structured documents from which the element string (224) was extracted. The element inventories (242) and the element distributions (244) are used to identify the most likely words and corresponding tokens that match to the element token (234).

At Step 208, tokens are reranked. The matched tokens (248) may be reranked by the rank controller (250) to generate the reranked tokens (252) using the corpus language model (258). In one embodiment, the matched tokens (248) are reranked by the usage of the token in the corpus documents used to train the corpus language model (258). For example, with the element token "prsn", the corresponding matched tokens may be "prison" and "person". In the corpus documents (e.g., tax forms and treatises), usage of the word "prison" may be statistically zero with usage of the word "person" being greater than zero. The reranked tokens would rank "person" higher than "prison" for the element token "prsn". A set of reranked tokens may be generated for each of multiple element token from a set of element tokens for the element string (224).

At Step 210, token sets are generated. In one embodiment, the token set (254) includes one of the cognate tokens (238) and the reranked tokens (252). The cognate tokens (238) may be included when the element token (234) represents a word recognized on the corpus documents. The reranked tokens (252) may be included when the element token (234) represents a word that is not recognized on the corpus documents. The tokens in the token set (254) (from either the cognate tokens (238) or the reranked tokens (252)) may include a threshold number of tokens (e.g., 10) that represent the most likely match to the element token (234) from a word used in the corpus documents.

At Step 212, name strings are generated. The name string (264) may be generated by the name controller (262) using the token sets (256), the corpus language model (258), and the corpus grammar rules (260). The name string (264) is in a natural language format. The natural language to which the name string (264) may be detected from the structured document from which the element string (224) was extracted.

In one embodiment, a form is presented with a field corresponding to a data model element identified by the element string (224). The data model element is an element in the structured document from which the element string (224) is extracted. The name string (264) is presented, in response to a user input, with the data model element after automatically generating the name string (264) for the element string (224). In one embodiment, the user input includes hovering a mouse over the field. For example, the user may view a tax form with a web browser. The tax form is a structured document with a data model element for a field in the tax form. When the user hovers the mouse over the field, the name string (264) may be displayed. The system may store the name string (264) in the structured document with the data model element that is used to generate the name string (264).

The token sets (256) include the token set (254) combined with other token sets corresponding to the remaining tokens from the element tokens (230). The token sets (256) include the element tokens (230) along with the cognate tokens and reranked tokens for each of the element tokens (230).

The name controller (262) identifies a sequence of tokens from the token sets (256) to form the name string (264). The corpus language model (258) may identify the frequency that two words appear within a threshold distance of words. From the word frequency, the name controller (262) may identify and rank sequences of cognate tokens and reranked tokens from the token sets (256). The corpus grammar rules (260) may be applied to the sequence with the highest rank to form a token sequence corresponding to the name string (264). The name controller (262) may then convert the token sequence to the name string (264) by concatenating the tokens and converting the tokens to strings. In one embodiment, the system may cache a mapping of the element string (224) to the name string (264) to bypass the process (200) for future occurrences of the element string (224).

Turning to FIG. 2B, the process (270) trains machine learning models. The process (270) may operate as part of the training application (280).

At Step 272, an element language model is generated. The element language model (283) is generated from the structured documents (282). The structured documents (282) are received and are written in a compressed language version of a base language. For example, the compressed language may remove vowels from words of a base language. The base language is a natural language, which may be English, French, Italian, etc. In one embodiment, the element language model (283) is an n-gram model trained using the structured documents. In one embodiment, the n-gram model is a 5-gram model that computes the word combinations of up to five words within the structured documents (282).

The element inventories (284) may also be generated from the structured documents. In one embodiment, the element inventories (284) include a consonant inventory and a vowel inventory for the words in the structured documents (282). The consonant and vowel inventories identify the frequencies of characters in the words used on the structured documents (282).

The element distributions (285) may also be generated from the structured documents (282). The element distributions (285) include vowel and consonant distributions for the spans of characters in the structured documents (282).

After the element language model (283), the element inventories (284), and the element distributions (285) are generated, the structured documents (282) may be updated with additional structured documents. For example, a new tax form may be introduced, or an existing tax form may be revised. After the structured documents (282) are updated, the element language model (283), the element inventories (284), and the element distributions (285) may likewise be updated.

At Step 274, a corpus language model is generated. The corpus language model (288) is generated from the corpus documents (287), which are in a domain related to the structured documents (282). In one embodiment the domain is tax forms and documents. The language of the structured documents (282) is detected with a language detector. The language detector receives the structured documents (282) and outputs a likelihood of the base language (e.g., English) of the structured documents (282).

The corpus documents (287) are received which are in the domain and the natural base language of the structured documents (282). In one embodiment, the corpus documents (287) are scraped from the website of a taxing authority.

The corpus language model is trained using the corpus documents (287). In one embodiment, the corpus language model (288) is a second n-gram model that is different from the first n-gram model of the element language model (283). In one embodiment, the n-gram model is a 5-gram model that computes the word combinations of up to five words within the corpus documents (287).

The corpus documents (287) may be updated, e.g., with a regulatory opinion of a tax form. The corpus language model (288) may be updated after the corpus documents (287) are updated.

Figure 3:
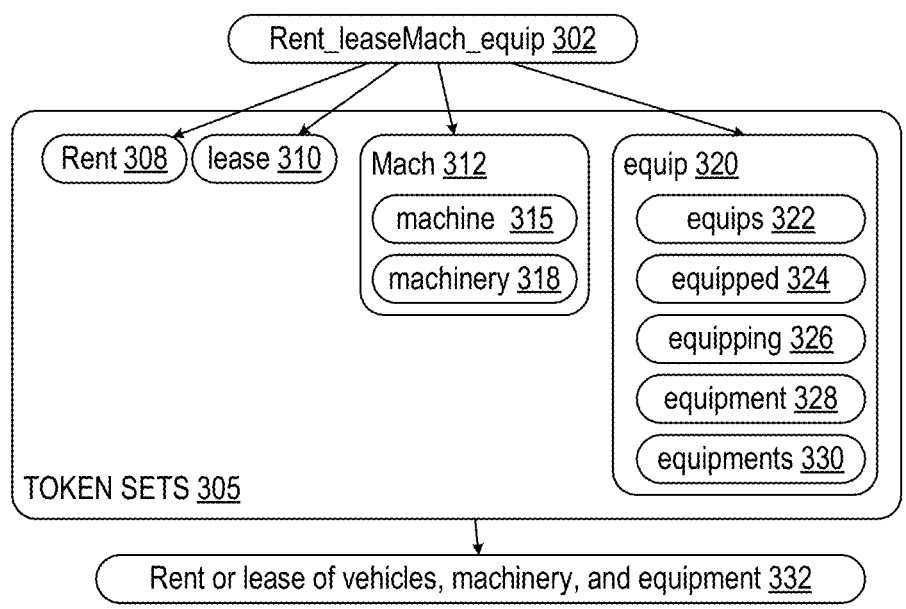

FIGS. 3 and 4 show examples in accordance with the disclosure. FIG. 3 shows an example of a name string generated from an element string. FIG. 4 shows an example of a name string presented with a form. The embodiments shown in FIGS. 3 and 4 may be combined and may include or be included within the features and embodiments described in the other figures of the application. The features and elements of FIGS. 3 and 4 are, individually and as a combination, improvements to machine learning technology and computing systems. The various features, elements, widgets, components, and interfaces shown in FIGS. 3 and 4 may be omitted, repeated, combined, and/or altered as shown. Accordingly, the scope of the present disclosure should not be considered limited to the specific arrangements shown in FIGS. 3 and 4.

Turning to FIG. 3, the name string (332) is generated from the element string (302) using the token sets (305). The element string (302) is received by the system from a structured document representing a tax form. The element string (302) represents a field of the tax form.

The element string (302) is tokenized to from the tokens "Rent" (308), "lease" (310), "Mach" (312), and "equip" (320). The element string (302) uses camel case (between "lease" and "Mach") and symbols ("_") as dividers between words. The words are in a compressed language version of a base language (English). E.g., "Mach" is a compressed form of the word "machinery".

The tokens "Rent" (308), "lease" (310) and "equip" (320) are recognized as words from corpus documents. The cognate tokens "equips" (322), "equipped" (324), "equipping" (326), "equipment" (328), and "equipments" (330) are identified for the token "equip" (320). The tokens "Rent" (308) and "lease" (310) are identified by the system as tokens for which cognate tokens are not generated.

The token "Mach" (312) is not recognized as a word in the corpus documents. The matched tokens "machine" (315) and "machinery" (318) are matched to the token "Mach" (312).

The name string (332) is generated from the tokens sets (305). The token sets (305) are input to a corpus language model to identify sequences of tokens. Each sequence of tokens is ranked by the corpus language model to identify the likelihood of the sequence appearing in the corpus documents. Additional tokens may be added to the sequence that do not appear in the token sets (305). Grammar rules are then applied to the highest ranked sequence, which is converted to the name string (332).

Turning to FIG. 4, the tax form (400) is displayed with the name string (402). The tax form (400) is stored in a structured document (e.g., an XML file). The structured document is rendered to be displayed on a client device (e.g., a laptop computer, a desktop computer, a mobile phone, etc.) and show the tax form (400).

The name string (402) is generated from an element string that represents the field (405) displayed on the client device. The element string for the field (405) is the element string "Rent_leaseMach_equip" (302) from FIG. 3. The name string (402) may be stored in the structured document from which the tax form (400) is rendered.

The name string (402) is displayed in response to user input. For example, the mouse cursor (408) may be moved by a user to hover above the field (405). After a predetermined amount of time (e.g., 1 second), the name string (402) may be displayed on the tax form (400).

Embodiments of the invention may be implemented on a computing system. Any combination of a mobile, a desktop, a server, a router, a switch, an embedded device, or other types of hardware may be used. For example, as shown in FIG. 5A, the computing system (500) may include one or more computer processor(s) (502), non-persistent storage (504) (e.g., volatile memory, such as a random access memory (RAM), cache memory), persistent storage (506) (e.g., a hard disk, an optical drive such as a compact disk (CD) drive or a digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (512) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (508), such as a screen (e.g., a liquid crystal display (LCD), a plasma display, a touchscreen, a cathode ray tube (CRT) monitor, a projector, or other display device), a printer, an external storage, or any other output device. One or more of the output device(s) (508) may be the same or different from the input device(s) (510). The input and output device(s) (510 and (508)) may be locally or remotely connected to the computer processor(s) (502), non-persistent storage (504), and persistent storage (506). Many different types of computing systems exist, and the aforementioned input and output device(s) (510 and (508)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Figure 5B:
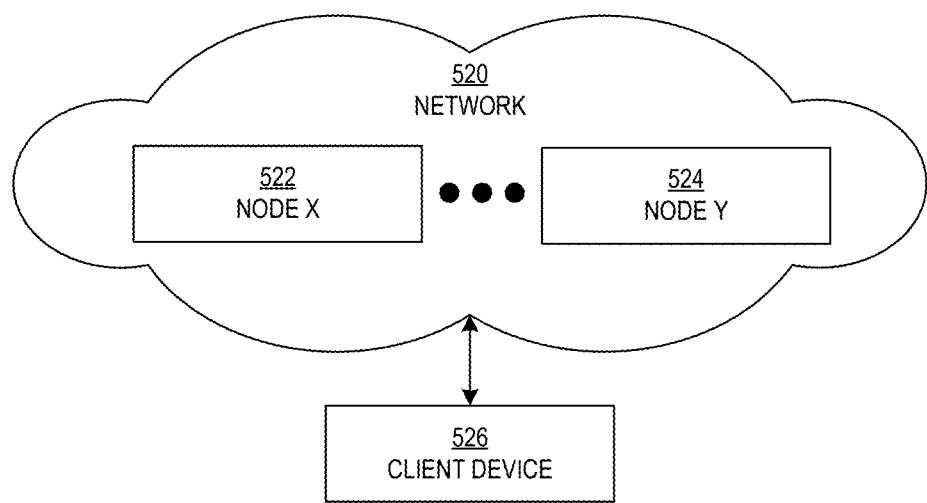

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving an element string, wherein the element string is in a compressed language format and is extracted from a document in a structured document language;
tokenizing the element string to form a plurality of element tokens;
determining that an element token of the plurality of element tokens does not match a cognate token, of a corpus language model for a natural language, as a word of the natural language;
in response to determining that the element token does not match the cognate token:
generating a plurality of matched tokens from the element token using an element language model for a compressed language, wherein the compressed language is a compressed language version of the natural language with one or more characters removed from one or more words of the natural language;
reranking the plurality of matched tokens to form a plurality of reranked tokens using the corpus language model;
generating a token set from the plurality of element tokens using a set controller configured to generate the token set using the plurality of reranked tokens;
generating a name string using a name controller configured to generate the name string from a plurality of token sets comprising the token set, wherein the name string is in a natural language format; and
presenting, to a client device, the name string in response to a user input after being automatically generated.

2. The method of claim 1, wherein the element token is a first element token, the method further comprising:
when a second element token, of the plurality of element tokens, is recognized:
generating a plurality of cognate tokens, comprising the cognate token from the second element token.

3. The method of claim 1, further comprising:
presenting a form with a field corresponding to a data model element identified by the element string; and
presenting the name string, in response to a user input, with the data model element after automatically generating the name string for the element string, wherein the user input comprises hovering a mouse over the field.

4. The method of claim 1, further comprising:
receiving a plurality of structured documents;
training an element language model using the plurality of structured documents, wherein the element language model is a first n-gram model;
generating element inventories from the plurality of structured documents;
generating element distributions from the plurality of structured documents;
updating the plurality of structured documents; and
updating the element language model, the element inventories, and the element distributions after updating the plurality of structured documents.

5. The method of claim 1, further comprising:
detecting a language of a plurality of structured documents;
receiving a plurality of corpus documents in a domain and the language of the plurality of structured documents;
training a corpus language model using the plurality of corpus documents, wherein the corpus language model is a second n-gram model;
updating the plurality of corpus documents; and
updating the corpus language model after updating the plurality of corpus documents.

6. The method of claim 1, further comprising:
tokenizing the element string by:
dividing the element string into the plurality of element tokens in response to identifying a divider, wherein the divider is one of a symbol and a change in case.

7. The method of claim 1, further comprising:
generating a plurality of cognate tokens using a corpus language model by matching the plurality of cognate tokens from the corpus language model to the element token.

8. The method of claim 1, further comprising:
generating a plurality of matched tokens using element inventories and element distributions by matching the plurality of matched tokens to the element token with the element distributions.

9. The method of claim 1, wherein the token set comprises one of a plurality of cognate tokens and the plurality of reranked tokens.

10. The method of claim 1, further comprising:
generating the name string by:
identifying a sequence of tokens from the plurality of token sets; and
converting the sequence of tokens to the name string.

11. A system comprising:
at least one processor;
a set controller configured to generate a token set;
a name controller configured to generate a name string;

an element language model configured to identify compressed language word sequences;
a corpus language model configured to identify natural language word sequences; and
a server application executing on the at least one processor and configured for:
receiving an element string, wherein the element string is in a compressed language format and is extracted from a document in a structured document language,
tokenizing the element string to form a plurality of element tokens,
determining that an element token of the plurality of element tokens does not match a cognate token, of a corpus language model for a natural language, as a word of the natural language,
in response to determining that the element token does not match the cognate token:
generating a plurality of matched tokens from the element token using an element language model for a compressed language, wherein the compressed language is a compressed language version of the natural language with one or more characters removed from one or more words of the natural language,
reranking the plurality of matched tokens to form a plurality of reranked tokens using the corpus language model,
generating, by the set controller, the token set from the plurality of element tokens using the element language model, the corpus language model, and the plurality of reranked tokens,
generating, by the name controller, the name string from a plurality of token sets comprising the token set, and, wherein the name string is in a natural language format,
presenting the name string in response to a user input after being automatically generated.

12. The system of claim 11, wherein the element token is a first element token, the method further comprising:
a cognate controller; and
the server application further configured for:
when a second element token, of the plurality of element tokens, is recognized:
generating, by the cognate controller, a plurality of cognate tokens, comprising the cognate token, from the second element token.

13. The system of claim 11, wherein the server application is further configured for:
presenting a form with a field corresponding to a data model element identified by the element string, and
presenting the name string, in response to a user input, with the data model element after automatically generating the name string for the element string, wherein the user input comprises hovering a mouse over the field.

14. The system of claim 11, wherein the server application is further configured for:
receiving a plurality of structured documents,
training the element language model using the plurality of structured documents, wherein the element language model is a first n-gram model,
generating element inventories from the plurality of structured documents,
generating element distributions from the plurality of structured documents,
updating the plurality of structured documents, and
updating the element language model, the element inventories, and the element distributions after updating the plurality of structured documents.

15. The system of claim 11, wherein the server application is further configured for:
detecting a language of a plurality of structured documents,
receiving a plurality of corpus documents in a domain and the language of the plurality of structured documents,
training a corpus language model using the plurality of corpus documents, wherein the corpus language model is a second n-gram model,
updating the plurality of corpus documents, and
updating the corpus language model after updating the plurality of corpus documents.

16. The system of claim 11, further comprising:
a token controller; and
the server application further configured for:
tokenizing, by the token controller, the element string by dividing the element string into the plurality of element tokens in response to identifying a divider, wherein the divider is one of a symbol and a change in case.

17. The system of claim 11, wherein the server application is further configured for:
generating a plurality of cognate tokens using a corpus language model by matching the plurality of cognate tokens from the corpus language model to the element token.

18. The system of claim 11, wherein the server application is further configured for:
generating a plurality of matched tokens using element inventories and element distributions by matching the plurality of matched tokens to the element token with the element distributions.

19. The system of claim 11, wherein the token set comprises one of a plurality of cognate tokens and the plurality of reranked tokens.

20. A method comprising:
receiving a structured document, the structured document comprising an element string,
wherein the element string is in a compressed language format,
wherein the element string is tokenized to form a plurality of element tokens,
wherein an element token of the plurality of element tokens does not match a cognate token, of a corpus language model for a natural language, as a word of the natural language,
wherein, in response to determining that the element token does not match the cognate token:
a plurality of matched tokens is generated from the element token using an element language model for a compressed language, wherein the compressed language is a compressed language version of the natural language with one or more characters removed from one or more words of the natural language, and
the plurality of matched tokens is reranked to form a plurality of reranked tokens using the corpus language model,
wherein a set controller is applied to the plurality of reranked tokens to generate a token set, and
wherein a name controller is applied to a plurality of token sets, comprising the token set, to generate a name string, from the element string, in a natural language format; and displaying the structured document with the name string in the natural language format in response to a user input.

\* \* \* \* \*